United States Patent [19]

Horiuchi et al.

[11] 4,271,344
[45] Jun. 2, 1981

[54] HIGH FREQUENCY HEATING OVEN WITH COOKING VESSEL

[75] Inventors: Masao Horiuchi, Tenri; Makiko Miyake, Ikoma; Chizuko Yoshida, Takaichi, all of Japan

[73] Assignee: Matsushita Electric Industrial Co., Ltd., Kadoma, Japan

[21] Appl. No.: 941,636

[22] Filed: Sep. 12, 1978

Related U.S. Application Data

[63] Continuation of Ser. No. 806,071, Jun. 13, 1977, abandoned.

[30] Foreign Application Priority Data

Jun. 16, 1976 [JP] Japan ................................ 51/79546

[51] Int. Cl.³ .............................................. H05B 6/80
[52] U.S. Cl. ................................ 219/10.55 E; 99/418
[58] Field of Search ........................... 99/410–418, 99/349, 445; 219/10.55 E, 10.55 M, 10.55 R

[56] References Cited

U.S. PATENT DOCUMENTS

| 717,655 | 1/1903 | Astle | 99/418 |
| 1,176,239 | 1/1972 | Green | 99/410 |
| 2,714,070 | 7/1955 | Welch | 219/10.55 E X |
| 3,076,405 | 2/1963 | Lang | 99/445 |
| 3,570,704 | 3/1971 | Roson et al. | 99/450 X |
| 3,985,990 | 10/1976 | Levinson | 219/10.55 E |
| 4,027,132 | 5/1977 | Levinson | 219/10.55 E |

Primary Examiner—Arthur T. Grimley
Attorney, Agent, or Firm—Wenderoth, Lind & Ponack

[57] ABSTRACT

A high frequency heating oven has an oven-defining housing having a heating chamber defined therein and a hingedly supported door for selectively closing and opening an access opening leading into the heating chamber. A cooking vessel, such as a saucepan or saucepot, is provided including a weighting plate removably accommodated within the vessel. The weighting plate is used to restrain the food being cooked in position within the vessel during the heating of the food by the use of the high frequency heating oven. The plate is made of dielectric material and has a plurality of vapor escapement holes.

1 Claim, 5 Drawing Figures

HIGH FREQUENCY HEATING OVEN WITH COOKING VESSEL

This is a Continuation, of application Ser. No. 806,071, filed June 13, 1977, now abandoned.

The present invention generally relates to a high frequency heating oven and, more particularly, to the combination of a high frequency heating oven with a cooking vessel for use in the high frequency heating oven.

In boiling a foodstuff in broth, a cooking vessel, such as a saucepan or saucepot, containing the broth with the foodstuff therein is generally heated by a range, such as a gas range. In this case, the boiling process takes place in such a manner that the foodstuff in the broth within the vessel is heated subsequent to heating of the broth. Because of the boiling process taking place in the manner as hereinabove described, any portion of the foodstuff protruding above the surface level of the broth within the cooking vessel is not dehydrated.

However, when a high frequency heating oven is used to boil the foodstuff in the broth within the cooking vessel, both are substantially simultaneously heated since they absorb high frequency electromagnetic waves generated in the heating chamber of the high frequency heating oven. Accordingly, where a portion of the foodstuff protrudes above the surface level of the broth within the vessel during the heating by the use of the high frequency heating oven, that portion of the foodstuff tends to be dehydrated. Dehydration brings about hardening of that portion of the foodstuff and the boiled foodstuff can no longer be served as a cooked food item on a table.

Accordingly, the present invention has for its essential object to provide a cooking vessel for use in a high frequency heating oven by means which a foodstuff can be tastefully prepared.

According to the present invention, there is provided a cooking vessel in the form of a saucepan having a weighting plate made of an electromagnetic wave permeable material, which weight lid has a specific gravity greater than 1 and having a plurality of apertures defined therein in a predetermined pattern for the passage of vapor therethrough. The weighting plate is, when the foodstuff is to be boiled within the heating chamber of the high frequency heating oven, placed within the cooking vessel, submerged in the broth and resting on the foodstuff in the broth, thereby substantially avoiding the possibility that a portion of the foodstuff will project above the surface level of the broth within the vessel during the boiling within the heating chamber of the high frequency heating oven.

These and other objects and features of the present invention will become apparent from the following description taken in conjunction with preferred embodiments thereof with reference to the accompany drawings, in which.

Before the description of the present invention proceeds, it is to be noted that like parts are designated by like reference numerals throughout the accompanying drawings.

Figure 1:
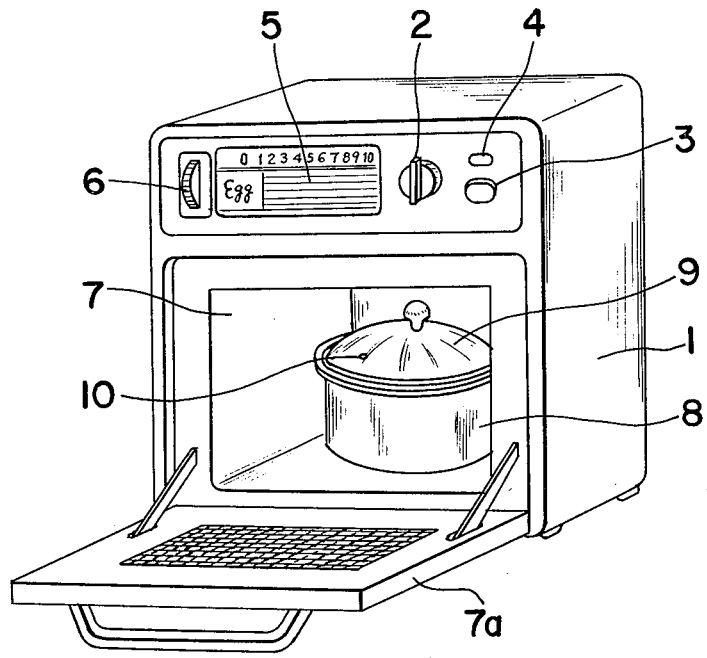
FIG. 1 is a schematic perspective view of a high frequency heating oven with an access door opened to show a cooking vessel placed within a heating chamber of the high frequency heating oven.

Referring now to FIG. 1, there is shown a high frequency heating oven comprising a housing 1 of substantially cubic shape having an access opening which leads into a heating chamber 7 defined in said housing 1, which access opening is selectively opened and closed by an access door 7a hinged to a front lower edge of the housing 1. The housing 1 has a front control panel above the access opening leading into the heating chamber 7, which control panel is provided with a timer manipulating knob 2, a start switch 3, a cooking indicator 4, a menu display unit 5 including a display drum and a drum manipulating ring 6 accessible to the hand of a user of the high frequency heating oven.

Figure 2:
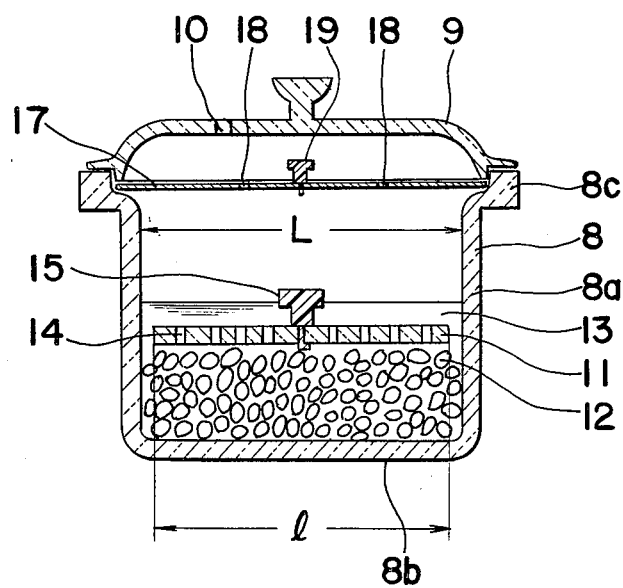
FIG. 2 is a longitudinal sectional view, on an enlarged scale, of the cooking vessel.
Figure 3:
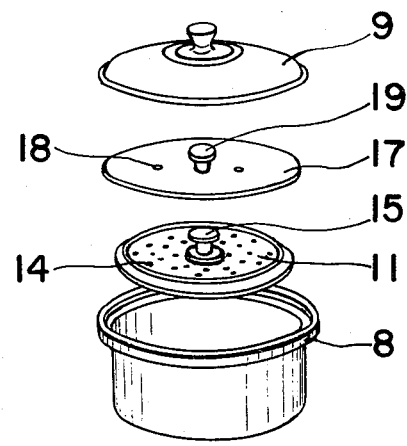
FIG. 3 is a perspective view of the vessel.

A cooking vessel 8, for example, a saucepan, is shown placed within the heating chamber 7 of the high frequency heating oven. As best shown in FIGS. 2 and 3, the cooking vessel 8 comprises a cylindrical body having a uniform inner diameter over substantially entire height thereof. The cylindrical body 8a has a lower end closed by a bottom wall 8b integral therewith and an upper end substantially radially outwardly enlarged to define a flange 8c. The cooking vessel 8 thus far described is made of electromagnetic wave permeable material, that is, dielectric material, such as glass or earthe ware.

The cooking vessel 8 includes a closure lid 9 made of electromagnetic wave permeable material or dielectric material and removably mounted on the flanged end 8c to close the top opening of the vessel 8. This closure lid 9 has at least one vent hole 10 for escapement of vapor from the interior of the vessel 8 therethrough to the outside of the vessel 8. The cooking vessel 8 further includes a weighting plate 11 made of electromagnetic wave permeable material or dielectric material having a relatively high resistance to elevated temperature, preferably, earthenware, and having a diameter smaller than the inner diameter of the cylindrical body 8a of the vessel 8. This weighting plate 11 has a plurality of through-holes 14 for a purpose as will be described later and has a specific gravity greater than 1.

In FIG. 2, the cooking vessel 8 is shown to contain therein a mass of beans 12 as a foodstuff to be boiled, which mass of beans 12 is immersed in a liquid medium 13, such as seasoned water, broth, soup or the like, contained in the vessel 8. The weighting plate 11 is shown to be so submerged in the liquid medium 13 and positioned above the mass of beans 12 as to forcibly immerse the beans in the liquid medium 13 without allowing some of beans to float on and/or protrude outwardly above the top level surface of the liquid medium 13 within the vessel 8 when the beans are heated to boil. The holes 14 in the weighting plate 11 serve to allow vapor incident to the boiling of the liquid medium 13 with the beans therein to escape therethrough to above the top surface level of the liquid medium 13 within the vessel 8.

For facilitating manipulation of the weighting plate 11, the latter has a knob 15 rigidly connected thereto 11 in alignment with the center of said plate 11 and made of a synthetic resin having a dielectric property.

Preferably, the size of the weighting plate 11 is so selected that the difference between the inner diameter L of the cylindrical body 8a of the vessel 8 and the diameter l of the weight lid 11 is not more than 7 mm. In addition, each of the holes 14 in the weight lid 11 has a diameter not more than 7 mm. In practice, since a relatively small size foodstuff frequently boiled in Japan is generally beans, a series of experiments have shown that if the difference between the inner diameter of the cylindrical body 8a of the vessel 8 and the diameter of the weight lid 11 and the diameter of each of the holes 14 in the weight lid 11 are both selected to be not more than 7 mm. as hereinabove described, the beans can be satisfactorily boiled without some of them floating on and/or protruding above the top surface level of the liquid medium 13. However, the difference (L-l) and the diameter of each of the holes 14 used not be always limited to 7 mm., but may have any suitable dimension depending upon the type of foodstuff to be boiled and if the weight lid satisfactorily serves the purpose of retaining the foodstuff within the liquid medium in the vessel 8.

The cooking vessel 8 of the construction thus far described can satisfactorily be used in boiling a foodstuff within the heating chamber 7 of the high frequency heating oven if the latter has a construction capable of generating a high frequency output of about 200 watts. On the other hand, most high frequency heating ovens now commerically available are of a type capable of generating a high frequency output of about 600 to 1,000 watts and they have no adjustment which makes it possible to lower the relatively high output to about 200 watts. In view of this, where the cooking vessel 8 having the above described construction is to be used in boiling the foodstuff within the heating chamber of any one of such commercially available high frequency heating ovens, the use of a shield lid 17, made of metallic material such as aluminum, is recommended to cause a portion of the high frequency electromagnetic waves to be reflected before reaching the foodstuff and to thereby substantially lower the high frequency output. Like the weighting plate 11, this shield lid 17 is also formed with a plurality of vent holes 18 defined therein and an access knob 19 of dielectric synthetic resin connected thereto in alignment with the center of the lid 17.

The manner of using the cooking vessel 8 in conjunction with the high frequency heating oven will now be described.

When the foodstuff 12, for example, beans or oden (a Japanese food item similar to hodgepodge) is to be cooked, the foodstuff and the liquid medium 13 are accommodated within the vessel 8 and, thereafter, the weighting plate 11 is placed above the foodstuff 12 to cause the latter to be completely immersed in the liquid medium 13. After the closure lid 9 has been mounted on the flanged end 8c of the vessel 8, with the foodstuff 12 and the liquid medium 13 therein, to close the top opening of the vessel 8, the latter is placed within the heating chamber 7 of the high frequency heating oven in the manner as shown in FIG. 1 and the access door 7a is subsequently closed.

The next step is to manipulate the ring 6 to rotate the drum of the menu display unit 5 to find the time required for the foodstuff to be cooked and the timer knob 2 is subsequently manipulated with reference to the the reading on the display unit 5. Thereafter, the start switch 3 is depressed or actuated to operate the high frequency heating oven.

Subsequent to the operation of the high frequency heating device, the foodstuff 12 and the liquid medium 13 are substantially simultaneously heated. When the liquid medium 13 is boiled, bubbles are generated from the bottom of the vessel 8 and rise upwardly through the holes 14 in the weight lid 11 towards the top surface level of the liquid medium 13, thereby transforming into vapor. Because of the provision of the holes 14 in the plate 11, there is no possibility that the weighting plate 11 will be lifted upwardly by the upwardly rising bubbles and, because of the employment of the weighting plate 11, the foodstuff can be boiled while remaining completely immersed in the liquid medium 14 throughout the cooking time set for the high frequency heating oven by the manipulation of the timer knob 2.

Accordingly, substantially the entire volume of the foodstuff 12 can be softened or cooked without being dehydrated and the liquid medium, that is, the broth, can satisfactorily penetrate into the foodstuff to enhance the taste.

Figure 4:
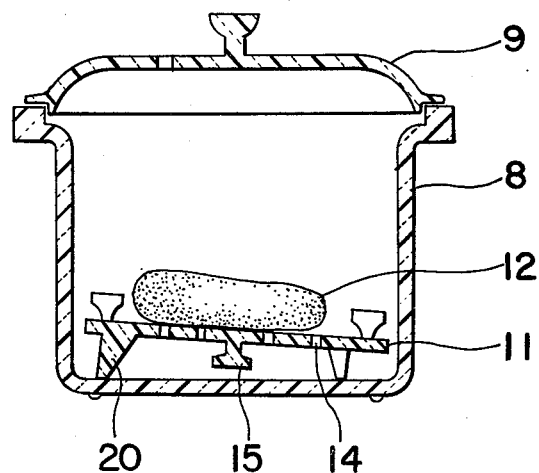
FIG. 4 is a view similar to FIG. 2, showing another preferred embodiment of the present invention.
Figure 5:
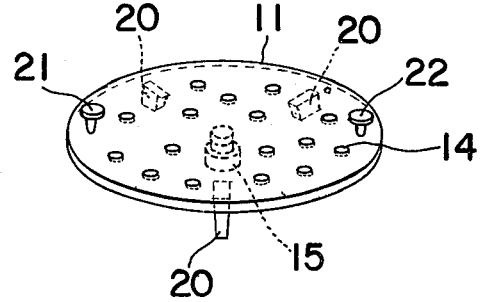
FIG. 5 is a perspective view of a weighting plate used in the cooking vessel shown in FIG. 4.

Referring now to FIGS. 4 and 5, the weighting plate 11 is shown as having a plurality of projections 20 rigidly mounted on the same surface where the knob 15 is mounted. The number of the projections 20 must be at least three as shown and the projections 20 are positioned in equally spaced relation to each other around the knob 15 and adjacent the periphery of the weighting plate 11. The projections 20 serve as legs when the weighting plate 11 is used upside down. More specifically, when the weighting plate 11 having the construction shown in FIGS. 4 and 5 is used in a manner similar to that in FIG. 2, the weighting plate 11 serves as a weight for retaining the foodstuff 12 in position within the vessel 8. However, when the weighting plate 11 is used upside down substantially as shown in FIG. 4, the weighting plate 11 can serve as a support grill for supporting the foodstuff 13 in spaced relation to and above the bottom of the vessel 8.

Preferably, as best shown in FIG. 4, one of the projections 20 has a height greater then that of the other projections 20 so that, when the weighting plate 11 is used as a support grill described above, the plate 11 will be inclined. This is particularly advantageous in that, when the foodstuff being heated is a meat such as shown, gravy from the meat can readily flow downwards to avoid th condition in which an excessive amount of such gravy remains on the upper surface of the meat.

Furthermore, for facilitating removal of the weighting plate 11 after the latter has been used as a support grill, the weighting plate 11 may have auxiliary knobs 21 and 22 on the other surface of the plate 11 opposite to the surface where the knob 15 and the projections 20 are mounted. Even these auxiliary knobs 21 and 22 are positioned adjacent the periphery of the plate 11 and spaced in any suitable manner from each other. However, where the weighting plate 11 is relatively heavy, these knobs 21 and 22 are so spaced from each other that, during the removal of the weighting plate 11 from the vessel 8 by grasping the knobs 21 and 22 with the hands of the user, the weight of the plate 11 will be suspended equally from the hands of the user. By way of example, the knobs 21 and 22 may be spaced 180° from each other around the center of the lid 11.

In the embodiment shown in FIGS. 4 and 5, the knob 15, the knobs 21 and 22 and the projections 20 may be made of any suitable moldable synthetic resin if the latter has a relatively low dielectric constant. However, they are preferably made of the same material as the plate 11 and, therefore, integral with said plate 11, in which case the weighting plate 11 can be used for a long period of time without separation of any one of the knob 15, the knobs 21 and 22 and the projections 20 from the plate.

Although the present invention has been fully described in connection with the preferred embodiments thereof with reference to the accompanying drawings, it is to be noted that various changes and modifications will be apparent to those skilled in the art. By way of example, if it is desired that the high frequency heating oven have the capability of adjusting the high frequency output, for example, from about 600 to 1,000 watts to about 200 watts, and vice versa, what is required is to provide an adjustable capacitance component in the voltage multiplier circuit employed in the magnetron power generating circuitry of the high frequency heating oven. In this case, the arrangement can be such that the high frequency heating oven can be switchable from one operating mode, in which the high frequency output is about 600 to 1,000 watts, to another operating mode in which the high frequency output is about 200 watts, merely by the manipulation of the drum rotating ring 6.

Such changes and modifications are, unless they depart from the true scope of the present invention, to be understood as being included therein.

What is claimed is:

1. A cooking vessel for use in a high frequency heating oven comprising: a cylindrical body having a bottom; and a combination weighting plate and foodstuff support positioned in said cylindrical body with a space between the inside surface of the cylindrical body and the outside periphery of the combination weighting plate and foodstuff support, said cylindrical body and bottom and said combination weighting plate and foodstuff support both being made of an electromagnetic wave permeable material and having a specific gravity greater than 1, said combination weighting plate and foodstuff support having a plurality of vapor escapement holes therein and a plurality of projections on one surface thereof, one of said projections having a height greater than that of the remaining projections and further having at least one auxiliary knob on the surface opposite the surface with said projections thereon, said auxiliary knob being positioned adjacent the periphery of said combination weighting plate and foodstuff support, whereby said combination weighting plate and foodstuff support can be turned with the projections extending down and be used as an inclined support for foodstuff and can be lifted by said auxiliary knob with the foodstuff thereon, and said combination weighting plate and foodstuff support can be turned with the projections extending up and be placed as a weighting plate on foodstuff being cooked in said vessel.

* * * * *